United States Patent
Lin

(10) Patent No.: US 9,462,167 B2
(45) Date of Patent: Oct. 4, 2016

(54) IMAGE CAPTURING DEVICE WITH MULTIPLE LENSES

(71) Applicant: Chiun Mai Communication Systems, Inc., New Taipei (TW)

(72) Inventor: Ding-Yu Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/613,791

(22) Filed: Feb. 4, 2015

(65) Prior Publication Data

US 2016/0065810 A1    Mar. 3, 2016

(30) Foreign Application Priority Data

Sep. 3, 2014   (CN) .......................... 2014 1 0445131

(51) Int. Cl.
  *H04N 5/225*  (2006.01)
  *H04N 5/232*  (2006.01)
  *H04N 5/265*  (2006.01)

(52) U.S. Cl.
  CPC ........ *H04N 5/2254* (2013.01); *H04N 5/23222* (2013.01); *H04N 5/265* (2013.01)

(58) Field of Classification Search
  CPC ..................... H04N 13/0214; H04N 13/0217; H04N 3/1593; H04N 5/3415; H04N 5/23238; H04N 5/23232; H04N 5/247; H04N 2013/0088; H04N 5/2258; H04N 2209/048; H04N 2209/049; H04N 9/09; G06T 2200/32; G06T 3/4038; G06T 7/0024; B60R 2300/303; G03B 37/00; G03B 37/02; G03B 37/04; G03B 37/06; G06K 2009/2045; G08B 13/19628
  USPC ................................................... 348/207.11
  See application file for complete search history.

(56) References Cited

U.S. PATENT DOCUMENTS

| | | | | |
|---|---|---|---|---|
| 7,218,994 | B2* | 5/2007 | Kanda | G05D 1/0251 318/568.12 |
| 8,908,054 | B1* | 12/2014 | Koenck | H04N 5/2254 348/218.1 |
| 9,019,426 | B2* | 4/2015 | Han | H04N 5/2253 348/222.1 |
| 9,171,221 | B2* | 10/2015 | Lablans | H04N 5/23238 |
| 9,179,063 | B1* | 11/2015 | Vegh | H04N 5/23238 |
| 2005/0165508 | A1* | 7/2005 | Kanda | G05D 1/0251 700/245 |
| 2007/0291143 | A1* | 12/2007 | Barbieri | H04N 5/232 348/264 |
| 2008/0158346 | A1* | 7/2008 | Okamoto | H04N 5/23238 348/47 |
| 2010/0097444 | A1* | 4/2010 | Lablans | G03B 35/00 348/46 |
| 2011/0293255 | A1* | 12/2011 | Kikuchi | G02B 7/102 396/80 |
| 2012/0062780 | A1* | 3/2012 | Morihisa | H04N 5/2258 348/333.13 |
| 2012/0169842 | A1* | 7/2012 | Chuang | G08B 13/19619 348/39 |
| 2013/0094848 | A1* | 4/2013 | Wada | H04N 5/2252 396/448 |
| 2013/0229529 | A1* | 9/2013 | Lablans | H04N 5/23238 348/169 |
| 2015/0098079 | A1* | 4/2015 | Montgomery | G01S 17/42 356/138 |
| 2015/0163400 | A1* | 6/2015 | Geiss | H04N 5/23229 348/231.99 |

* cited by examiner

*Primary Examiner* — Pritham Prabhakher

(74) *Attorney, Agent, or Firm* — Zhigang Ma

(57) ABSTRACT

An image capture device includes a base, a zoom module, a wide-angle module, and a telemeter module. The wide-angle module captures a background image. The telemeter module detects a distance between a target to be captured and the image capture device. The zoom module is rotatably disposed on the base, and the wide-angle module and the telemeter module are rotatably disposed on the zoom module. The zoom module adjusts focus to capture the target according to the distance and captures a main image. The image capture device combines the main images captured by the zoom module and the background images captured by the wide-angle module to form a series of combination images.

10 Claims, 4 Drawing Sheets

IMAGE CAPTURING DEVICE WITH MULTIPLE LENSES

FIELD

The subject matter herein generally relates to image capturing.

BACKGROUND

Image capturing devices such as cameras have only one framing lens for capturing images, which limits framing width and direction.

BRIEF DESCRIPTION OF THE DRAWINGS

Implementations of the present technology will now be described, by way of example only, with reference to the attached figures.

DETAILED DESCRIPTION

Figure 1:
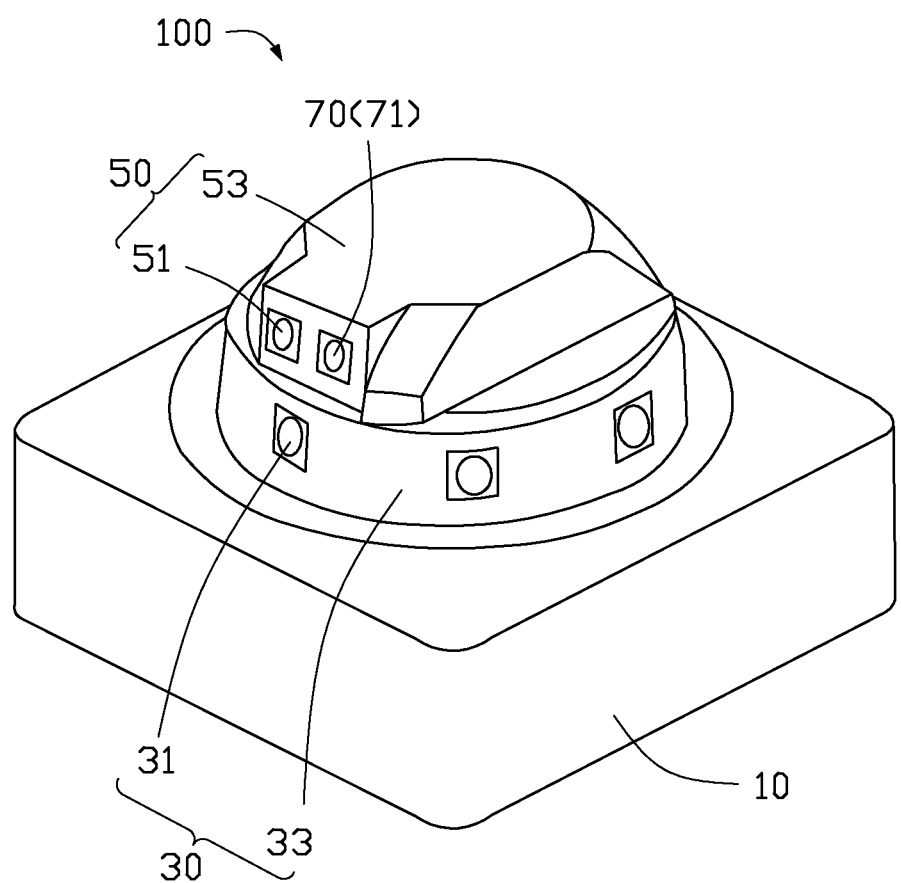
FIG. 1 is an isometric view of a first embodiment of an image capturing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 4:
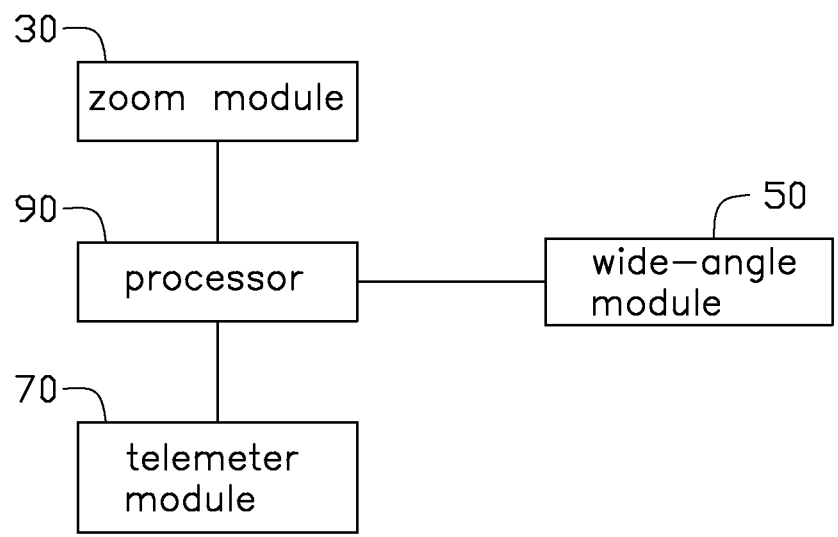
FIG. 4 is a block diagram of the image capturing device.

FIGS. 1 and 4 illustrate a first embodiment of an image capturing device 100 including a base 10, a zoom module 30, a wide-angle module 50, and a telemeter module 70. The zoom module 30 is rotatably coupled to the base 10, and the wide-angle module 50 and the telemeter module 70 are rotatably disposed to the zoom module 30. The zoom module 30 is configured to capture a main image of a target, and the wide-angle module 50 is configured to capture a background image for the main image. The telemeter module 70 is configured to detect a distance between the image capturing device 100 and the target. The zoom module 30 automatically adjusts a focal length according to a distance detected by the telemeter module 70. The image capturing device 100 may further include a processor 90 configured to process data from the zoom module 30, from the wide-angle module 50, and from the telemeter module 70, such as combining the main image captured by the zoom module 30 and the background image captured by the wide-angle module 50 to form a combination image. In one embodiment, the image capturing device 100 can be used for video conferencing.

The zoom module 30 includes a plurality of zoom lenses 31 and a rotatable holder 33. The rotatable holder 33 is substantially cylindrical and is rotatably disposed on a top of the base 10. The zoom lenses 31 are equidistantly arranged on a sidewall of the rotatable holder 33 and are configured to automatically focus on the target and take pictures. When the zoom module 30 is scanning, the rotatable holder 33 rotates in a predetermined speed relative to the base 10 to drive the zoom lenses 31 to rotate. The zoom lenses 31 take pictures when rotating, and the processor 90 processes and combines the pictures taken by each zoom lens 31 to form the main image.

The wide-angle module 50 includes a wide-angle lens 51 and a rotatable member 53. The wide-angle lens 51 and the telemeter module 70 are arranged in parallel on a sidewall of the rotatable member 53. In the first embodiment, the telemeter module 70 is a telemeter lens 71 having automatic focusing function. The rotatable member 53 is rotatably coupled to a top of the rotatable holder 33 to rotate relative to the rotatable holder 33 and the base 10. Therefore, the rotatable member 53 can drive the wide-angle lens 51 and the telemeter lens 71 to rotate relative to the rotatable holder 33 and the base 10. The wide-angle lens 51 is configured to capture a background image for the target being captured. The telemeter lens 71 is configured to detect a distance between the target and the image capturing device 100, such that the zoom lenses 31 are encouraged to focus on the target. In the first embodiment, the telemeter lens 71 is a wide-angle lens. The telemeter lens 71 captures an image of the target being captured, and the processor 90 determines the distance according to the image captured by the telemeter lens 71. Therefore, the zoom lenses 31 automatically adjust each focusing operation according to the detected distance, thus focusing faster and more precisely.

Figure 2:
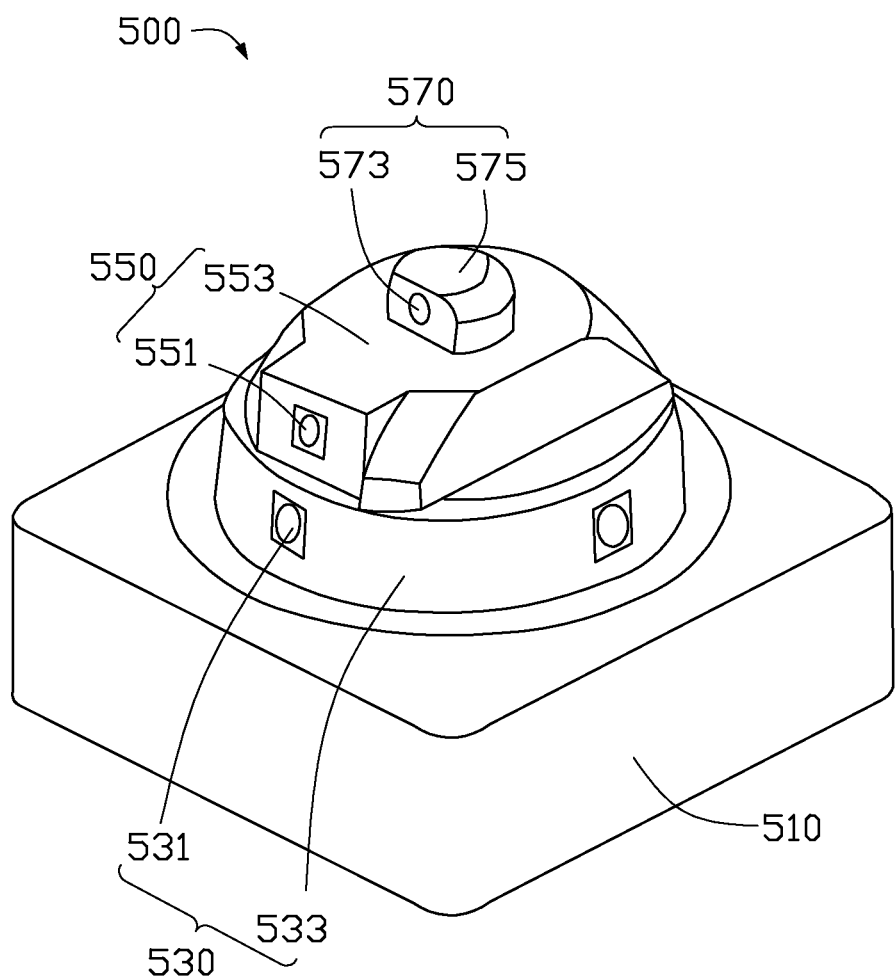
FIG. 2 is an isometric view of a second embodiment of the image capturing device of FIG. 1.

FIG. 2 illustrates a second embodiment of an image capturing device 500 which includes a base 510, a zoom module 530, a wide-angle module 550, and a telemeter module 570. The base 510, the zoom module 530, and the wide-angle module 550 have substantially similar structure to that of the first embodiment. The telemeter module 570 includes a laser emitter 573 and a rotatable piece 575. The laser emitter 573 is coupled to a sidewall of the rotatable piece 575. The rotatable piece 575 is rotatably coupled to a top of a rotatable member 553 and configured to drive the laser emitter 573 to rotate relative to the wide-angle module 550, the zoom module 530, and the base 510.

In the second embodiment, the laser emitter 573 is configured to emit a laser beam to the target to be captured and calculate the distance between the target and the image capturing device 500. Zoom lenses 531 can focus on the target faster and more precisely according to the distance detected by the laser emitter 573. The rotatable piece 575 rotates with a speed at least two times faster than the rotation speed of rotatable holder 533. Therefore, the processor 90 can obtain distances of the target and the image capturing device 500 in advance, that enables better and faster focusing of the zoom lenses 531 on the target, thus a quantity of the zoom lenses 531 can be decreased.

Figure 3:
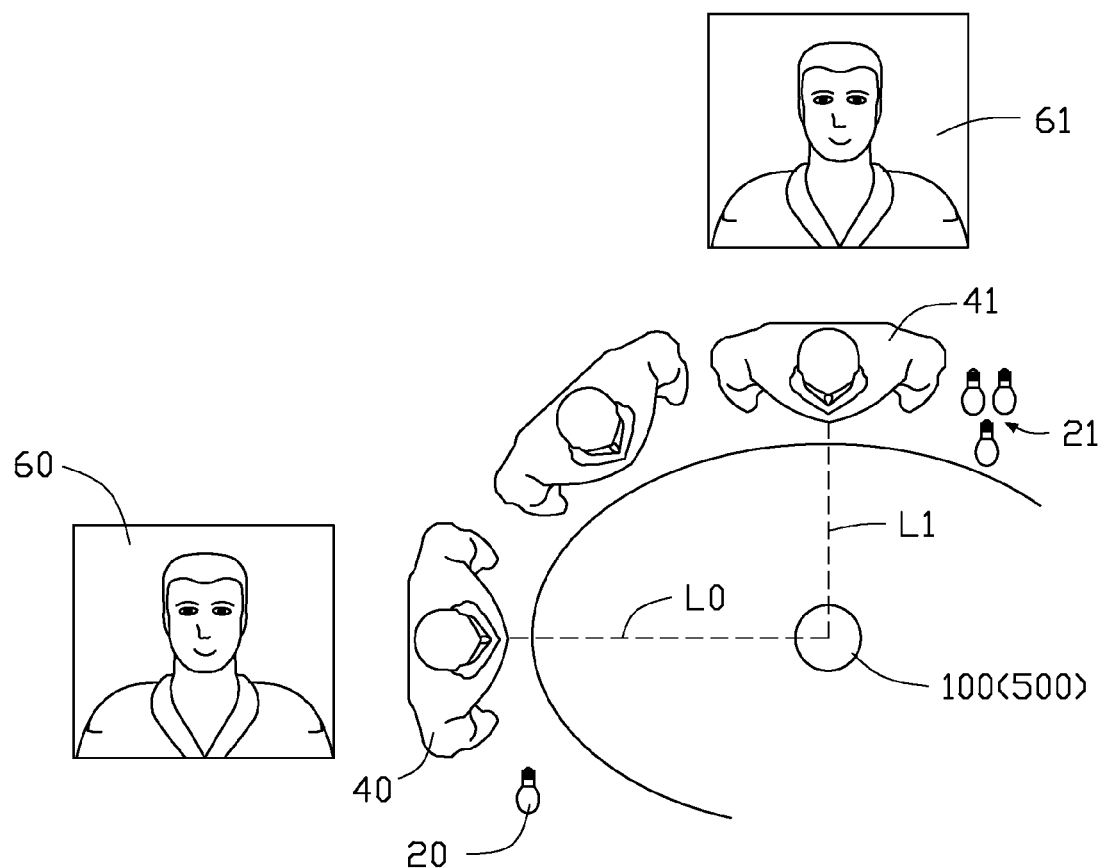
FIG. 3 is a diagrammatic view of the image capturing device of FIG. 1 in use.

FIG. 3 illustrates the image capturing device 100 (500) capturing multiple targets 40, 41 at different distances and in different brightness conditions. The targets 40, 41 are spaced from the image capturing device 100 (500) at respective with distances L0, L1 and in different brightness 20, 21. The distance L0 is larger than the distance L1 and the brightness 20 of the target 40 is less than the brightness 21 of the target 41. The telemeter lens 71 or the laser emitter 573 detects the distances to the targets 40, 41, the zoom lenses 31 (531) adjust the focus according to the detected distances and then take pictures. The processor 90 combines the pictures taken by the zoom lenses 31 (531) into the main image. Meanwhile, the wide-angle lens 51 (551) captures the background image. The processor 90 combines the main image of the zoom lenses 31 (531) and the background image of the wide-angle lens 51 (551) to form a combination image, and then outputs two substantially similar images 60, 61. The effects of different distances and different brightnesses are therefore reduced.

The image capturing device 100 (500) includes an automatic focusing function carried out by the zoom module 30 (530), a background capture function carried out by the wide-angle module 50 (550), and a distance detection function of the telemeter module 70 (570). The zoom module 30 (530), the wide-angle module 50 (550), and the telemeter module 70 (570) rotate at respective in predetermined speeds, and the telemeter module 70 (570) rotates faster than the zoom module 30 (530). The telemeter module 70 (570) constantly establishes distance to the target and the image capturing device 100 (500) to the zoom module 30 (530), and the zoom module 30 (530) adjusts focus for the target accordingly and main images are constantly being captured. Meanwhile the wide-angle module 50 (550) keeps capturing background images. The processor 90 combines the main images captured by the zoom module 30 (530) and the background images captured by the wide-angle module 50 (550) to form high quality and almost continuous combination images. The image capturing device 100 (500) decreases the effects of image capturing at affection in different distances and in different brightness conditions.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An image capture device comprising:
   a base;
   a zoom module rotatably disposed on the base and comprising a rotatable hole and a plurality of zoom lenses equidistantly arranged on a sidewall of the rotatable holder, the rotatable holder rotatable disposed on a top of the base, the rotatable holder rotating in a predetermined speed relative to the base and thus to drive the zoom lenses to rotate;
   a wide-angle module capturing a background image and comprising a wide-angle lens and a rotatable member, the rotatable member rotatable disposed on a top of the rotatable holder, the rotatable member rotating relative to the rotatable holder and the base; and
   a telemeter module detecting a distance between a target to be captured and the image capture device, the telemeter module comprising a laser emitter and a rotatable piece, the laser emitter coupled to a sidewall of the rotatable piece, the rotatable piece rotatably coupled to a top of a rotatable member and driving the laser emitter to rotate relative to the wide-angle module, the zoom module and the base;
   wherein the wide-angle module and the telemeter module are rotatably disposed on the zoom module, rotatable piece rotates with a predetermined speed at least two times faster than a rotate speed of a rotatable holder, the zoom lenses automatically adjust focus to capture the target according to the distance detected by the telemeter module and take pictures, the processor combines the picture took by each zoom lens to form a main image, the image capture device combines the main images captured by the zoom module and the background images captured by the wide-angle module to form a series of combination images.

2. The image capture device as claimed in claim 1, further comprising a processor, wherein the processor processes data from the zoom module, the wide-angle module, and the telemeter module.

3. The image capture device as claimed in claim 2, wherein the telemeter module comprises a telemeter lens, the wide-angle lens and the telemeter lens are arranged on a sidewall of the rotatable member in parallel and driven by the rotatable member to rotate.

4. The image capture device as claimed in claim 3, wherein the telemeter lens captures an image of the target, the processor determines the distance according to the image captured by the telemeter lens.

5. The image capture device as claimed in claim 2, wherein the laser emitter emits laser to the target to calculate the distance between the target and the image capturing device.

6. An image capture device comprising:
   a base;
   a zoom module rotatably disposed on the base and rotating relative to the base and keep capturing main images, the zoom module comprising a rotatable hole and a plurality of zoom lenses equidistantly arranged on a sidewall of the rotatable holder, the rotatable holder rotatably disposed on a top of the base, the rotatable holder rotating in a predetermined speed relative to the base and thus to drive the zoom lenses to rotate;
   a wide-angle module rotating and keeping capturing background images, the wide-angle module comprising a wide-angle lens and a rotatable member, the rotatable member rotatably disposed on a top of the rotatable holder, the rotatable member rotating relative to the rotatable holder and the base; and
   a telemeter module rotating and detecting a distance between a target to be captured and the image capture device, the telemeter module comprising a laser emitter and a rotatable piece, the laser emitter coupled to a sidewall of the rotatable piece, the rotatable piece rotatably coupled to a top of a rotatable member and driving the laser emitter to rotate relative to the wide-angle module, the zoom module and the base;
   wherein the wide-angle module and the telemeter module are rotatably disposed on the zoom module, rotatable piece rotates with a predetermined speed at least two times faster than a rotate speed of a rotatable holder, the zoom lenses automatically adjust focus to capture the target according to the distance detected by the telemeter module and take pictures, the processor combines the picture took by each zoom lens to form the main images, the image capture device combines the main images captured by the zoom module and the background images captured by the wide-angle module to form a series of combination images.

7. The image capture device as claimed in claim 6, further comprising a processor, wherein the processor processes data from the zoom module, the wide-angle module, and the telemeter module.

8. The image capture device as claimed in claim 7, wherein the telemeter module comprises a telemeter lens, the wide-angle lens and the telemeter lens are arranged on a sidewall of the rotatable member in parallel and driven by the rotatable member to rotate.

9. The image capture device as claimed in claim 8, wherein the telemeter lens captures an image of the target, the processor determines the distance according to the image captured by the telemeter lens.

10. The image capture device as claimed in claim 7, wherein the laser emitter emits laser to the target to calculate the distance between the target and the image capturing device.

* * * * *